(12) United States Patent
Eichhorn et al.

(10) Patent No.: US 8,038,763 B2
(45) Date of Patent: Oct. 18, 2011

(54) AU-PT HETEROAGGREGATE DENDRITIC NANOSTRUCTURES AND AU-PT ALLOY NANOPARTICLES AND THEIR USE AS CATALYSTS

(75) Inventors: Bryan W. Eichhorn, University Park, MD (US); Shenghu Zhou, Greenbelt, MD (US); Gregory Scott Jackson, University Park, MD (US)

(73) Assignee: University of Maryland, College Park, MD (US)

( * ) Notice: Subject to any disclaimer, the term of this patent is extended or adjusted under 35 U.S.C. 154(b) by 1283 days.

(21) Appl. No.: 11/638,572

(22) Filed: Dec. 14, 2006

(65) Prior Publication Data

US 2007/0237991 A1    Oct. 11, 2007

Related U.S. Application Data

(60) Provisional application No. 60/743,032, filed on Dec. 14, 2005.

(51) Int. Cl.
*B22F 9/24* (2006.01)

(52) U.S. Cl. ............ 75/351; 75/371; 516/97; 977/896

(58) Field of Classification Search .................. None
See application file for complete search history.

(56) References Cited

U.S. PATENT DOCUMENTS

| | | | |
|---|---|---|---|
| 6,245,494 B1* | 6/2001 | Andriessen et al. | 430/346 |
| 6,531,304 B1* | 3/2003 | Bonnemann et al. | 435/173.9 |
| 2003/0146019 A1* | 8/2003 | Hirai | 174/257 |
| 2004/0038506 A1* | 2/2004 | Kataoka et al. | 438/584 |
| 2006/0196310 A1* | 9/2006 | Toshima et al. | 75/392 |
| 2007/0186725 A1* | 8/2007 | Watabe | 75/744 |

* cited by examiner

*Primary Examiner* — George Wyszomierski
(74) *Attorney, Agent, or Firm* — William E. Beaumont

(57) ABSTRACT

Au—Pt heteroaggregate dendritic nanostructures and AuPt alloy nanoparticles, and their use as anodic catalysts in fuel cells.

18 Claims, 12 Drawing Sheets

A diagram showing the makeup of a fuel cell and the reaction it uses to produce electricity.

Figure 3. TEM images of a) Au NP core particles, b) Au-Pt dendritic aggregates (particle enlargement in inset), c) EELS line scan across the Au-Pt particle showing atomic composition (Au-1, Pt-2) as a function of beam displacement across the particle. The beam path is shown in d) with particle center occurring at ~ 18 nm.

STEM phase maps

STEM image of AuPt heteroaggregate particles (left) with corresponding Pt (yellow, center) and Au (green, right) phase maps. The data show that the particles have Au cores and Pt appendages.

EELS Data

Low loss EELS signatures

Au and Pt atomic density

AU-PT HETEROAGGREGATE DENDRITIC NANOSTRUCTURES AND AU-PT ALLOY NANOPARTICLES AND THEIR USE AS CATALYSTS

CROSS REFERENCE TO RELATED CASES

This application claims the benefit of Provisional U.S. Application Ser. No. 60/743,032, filed Dec. 14, 2005, which is incorporated by reference herein in its entirety.

STATEMENT REGARDING FEDERALLY SPONSORED RESEARCH

The work leading up to the present invention was funded, at least in part, by the National Science Foundation under Grant No. 0401850, and the U.S. Department of Energy/Oak Ridge National Lab under the Advanced Reciprocating Engine Systems Program.

BACKGROUND OF THE INVENTION

1. Field of the Invention

This present application relates generally to AuPt heteroaggregate dendritic nanoparticles and, AuPt alloy nanoparticles and methods of using the same as catalysts.

2. Description of the Background

Hydrogen fuel cells generate electricity from the reaction of hydrogen at the anode side, and oxygen at the cathode side of the cell. FIG. 1 illustrates the general construction of a conventional hydrogen fuel cell with the reaction used to produce electricity.

A particularly advantageous type of hydrogen fuel cell is the Proton Exchange Membrane (PEM) fuel cell. FIG. 2 illustrates a conventional PEM fuel cell.

Proton Exchange Membrane (PEM) fuel cell devices transform the chemical energy liberated during the electrochemical reaction of hydrogen and oxygen to electrical energy. A stream of hydrogen is delivered to the anode side of the membrane-electrode assembly. At the anode, hydrogen is catalytically split into protons and electrons. This oxidation half cell reaction is represented by:

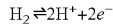

$$H_2 \rightleftharpoons 2H^+ + 2e^-$$

The newly formed protons permeate through a polymer electrolyte membrane to the cathode. The electrons travel along an external load circuit to the cathode side, thus creating a current output of the fuel cell.

At the same time, a stream of oxygen is delivered to the cathode side of the membrane electrode assembly, where oxygen atoms react with protons permeating through the polymer electrolyte assembly and the electrons arriving through the external circuit to form water molecules. This reduction half cell reaction is represented by:

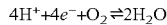

$$4H^+ + 4e^- + O_2 \rightleftharpoons 2H_2O$$

Pure platinum (Pt) has been used as a catalyst to split hydrogen atoms at the cathode site. Unfortunately, Pt is easily poisoned by carbon monoxide such that amounts of carbon monoxide at a level of 10 ppm can be problematic. Presently, the primary industrial source of hydrogen is from reformed hydrocarbon fuels, such as methane, which yields carbon monoxide contaminated feeds. In fact, pure Pt is poisoned by carbon monoxide to such an extent that $H_2$ oxidation does not occur below 170° C. when carbon monoxide is present at the level of about 1,000-2,000 ppm. This is problematic inasmuch as PEM fuel cell devices using Pt anodes must operate at temperatures below 100° C., the boiling point of water.

Widespread use of hydrogen in fuel cell devices in the near term will require $H_2$ supplies generated from carbon-based sources (i.e. methane reforming and Water Gas Shift reactions). In the absence of a breakthrough in photochemical water splitting or some other transformation technology for producing water, fossil fuel and hydrocarbons are the only economically and technologically viable sources of hydrogen. Unfortunately, hydrogen produced by these methods is contaminated with carbon monoxide (CO) at levels that range from 100 ppm to 10,000 ppm. Commercial fuel cells that run on hydrogen fuels currently use Pt or Pt—Ru catalysts to activate the $H_2$ in the anode chamber. Pt is required because it is the only metal that can activate hydrogen below the 100° C. temperature limit of a water-based PEM fuel cell. However, the presence of CO in low concentrations severely poisons the PT catalyst and drives the activation (light-off) temperature above 150° C. This shift in light off temperature renders the fuel cell inoperative because the water-based fuel cell membrane is destroyed above 100° C. Because there is no viable solution to this problem, the major PEM fuel cell manufacturers (Ballard, GM, Plug Power) have specified that only pure hydrogen could be used in their devices. Pure, CO-free hydrogen can only be prepared from electrolysis of water or arduous gas purifications steps. Both methods are remarkably expensive, energetically uphill and not easily amendable to large scale production. Large-scale implementation of hydrogen fuel cells will, thus, require breakthroughs in either the production of pure hydrogen feeds or the development in CO-tolerant anode catalysts.

Recent reports of a Au—Pt bimetallic system have indicated CO-oxidation and $CH_3OH$ electo-oxidation activities. For example, it demonstrated by Chandler et al. and Crook et al. that Au—Pt bimetallics have unusual activities with regard to CO oxidation. The synthetic methodologies used in these studies involve the use of organic dendrimers that coordinate the precursor complexes prior to reduction to the metallic state. The dendrimer method permits the formation of the very small, homogeneous and monodispersed particles with well defined compositions, but dendrimers are prohibitively expensive and furthermore the resulting particles are difficult to characterize due to their sub-nanometer size. Because of the thermodynamic immiscibility of Au and Pt throughout most of the composition and temperature range, alloy formation is rarely described and particles containing both elements are typically just referred to as "bimetallics" without reference to any specific architecture. The synthesis and characterization of Pt@Au and Au@Pt core shell particles have also been reported but their properties were not well defined and their architectures uncharacterized.

Thus, a need exists for an anode catalyst for hydrogen fuel cell devices which can better tolerate carbon monoxide, and continue to function at acceptable temperatures, i.e., at 100° C. or less.

SUMMARY OF THE INVENTION

Accordingly, it is an object of the present invention to provide AuPt alloy nanoparticles and an Au—Pt heteroaggregate dendritic nanostructures for use as an anode catalyst for hydrogen fuel cell devices, particularly PEM fuel cell devices.

It is also an object of the present invention to provide a hydrogen fuel cell, PEM fuel cell device, particularly containing one or both of the above anode catalysts.

Further, it is an object of the present invention to provide methods of making AuPt alloy nanoparticles and Au—Pt heteroaggregate dendritic nanostructures.

It is, moreover, an object of the present invention to provide a method of catalytically splitting hydrogen using either the Au—Pt heteroaggregate dendritic nanostructures or the Au—Pt alloy nanoparticles, or both.

It is also an object of this invention to provide a solution method for the preparation of metastable metal alloys.

It is, further, an object of the present invention to provide a vehicle powered by a fuel cell device containing one or both of the above anode catalysts.

DETAILED DESCRIPTION OF THE PREFERRED EMBODIMENTS

Figure 1:
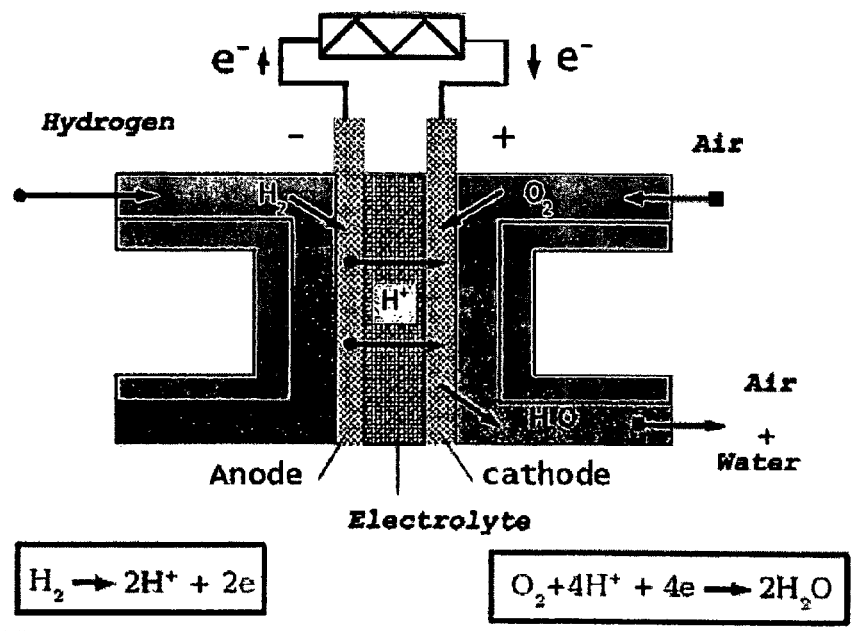
FIG. 1 illustrates the construction of a typical and conventional hydrogen fuel cell.
Figure 2:
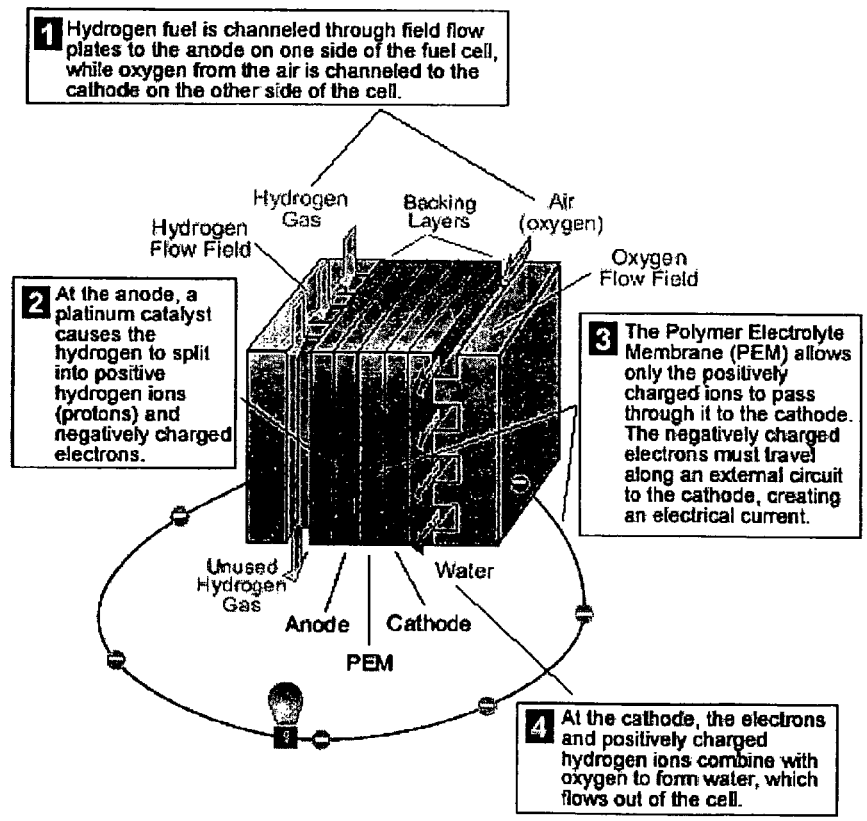
FIG. 2 illustrates the construction of a conventional Proton Exchange Membrane (PEM) fuel cell.

The present invention is predicated, at least in part, upon the discovery of AuPt alloy nanoparticles which are spherical in shape, and also Au—Pt heteroaggregate nanostructures, which are dendritic in shape. Both the spherical nanoparticles and the dendritic nanostructures may be used advantageously as catalysts for anode sites of hydrogen fuel cells, particularly PEM fuel cells.

Additionally, the present invention is also predicated, at least in part, upon the discovery that both the AuPt spherical alloy nanoparticles and the Au—Pt heteroaggregate dendritic nanostructures may also incorporate transition metals, such as Fe, for example, as a catalyst promoter. However, the catalytic activity of the Au—Pt heteroaggregate dendritic nanostructures is particularly enhanced by the inclusion therein of transition metals, such as Fe, as a catalyst promoter.

The Au—Pt heteroaggregate dendritic nanoparticle contains an architecture which entails Pt tendrils attached to a gold nanoparticle. The structure of the particle is different from traditional alloy and core-shell particles and it is believed that this architecture is important in obtaining the particularly robust catalytic activity which is observed. However, the presence of one or more transition metals is also required in order to obtain a high level of catalytic activity. More specifically, the present invention provides, in part, Au—Pt dendritic nanoparticles that show very high selectivity for CO oxidation and high $H_2$ thermal oxidation activity below 100° C. in mixed $CO/H_2$ fuel streams. At 1000 ppm CO concentrations, the present Au—Pt dendritic nanoparticles show 100% thermal CO oxidation and complete $O_2$ conversion ($H_2$ light-off) at 90° C. In addition, the present nanostructures function as a catalyst which is about 100% selective for Preferential CO Oxidation (PROX) in hydrogen fuel streams. The Au—Pt heteroaggregate dendritic nanostructure is used advantageously as a catalyst which provides a viable alternative to commercial Pt fuel cell anodes that cannot tolerate CO contaminated hydrogen fuels.

As noted above, the present Au—Pt heteroaggregate dendritic nanostructure is particularly effective with transition metal promoters. The transition metal promoters may be in the form of soluble salts or organic complexes. For example, when using Fe as a promoter, $Fe(NO_3)_3$, $FeCl_3$, $FeCl_2$, and $Fe(CO)_5$ or even ferrocene may be used.

Other transition metals which may be used as catalyst promoters are Mn, Ce, Ti, Co, Ni, V or even Cr, for example, which may be loaded onto a catalyst support in the form of salts or organic complexes of the metal used. Generally, as used herein disclosures of "transition metal content" such as "Fe content" refers to the metal content irrespective of the form in which it is loaded with supported catalyst.

As used herein the following terms and acronyms are defined as indicated.

"Dendritic" means tree-shaped or branched-shaped and derives from the Greek word for "tree." The term has also been used to describe the tree-like shape of main streams, tributaries and sub-tributaries of river systems.

"Heteroaggregate" means a combination of at least two elements, Au—Pt, for example, which are chemically bonded, but not alloyed with each other.

"Tendril" means an extension or promenance form the face of the nanoparticle Au core.

"Metastable binary alloy" means an atomically mixed solid that is thermodynamically immiscible. For example, a thermodynamic phase diagram for Au and Pt indicates that Au and Pt do not alloy below 1,100° C. at a 1:1 ratio. A room temperature alloy of AuPt, thus, is thermodynamically unstable, but can, nevertheless, be trapped kinetically. It is, thus, "metastable." Examples of other binary alloys which are metastable at ambient temperature are AuNi, AuW, AuRh and PtW, for example.

"Metastable NP" means a nanoparticle of metastable alloy.
TEM is transmission electron microscopy.
EELS is electron energy loss spectroscopy.
XRD is X-ray diffraction.
STEM is scanning transmission electron microscope.
NP(s) is nanoparticle(s).
EDS is energy dispersive spectrometer spectrum.
TPO is temperature programmable oxidation.

Generally, the present Au—Pt dendritic heteroaggregate nanostructures have a Au core with Pt tendrils on the surface of the Au core. Moreover, the present nanoparticles generally have a particle size of from about 6 to 30 nm, and preferably from about 8 to 26 nm. Further, the Au cores of the heteroaggregate nanostructures have a size of from about 4 to 22 nm, and preferably from about 6 to 20 nm. The Pt tendrils generally have a size of from about 0.5 to 8 nm, preferably from about 2 to 6 nm. For example, the present nanostructures may have a Au core of about 11 nm in size, and Pt tendrils of about 5 nm in size.

The, the present AuPt alloy nanoparticles as well as other metastable metal alloys may be made using the following exemplary solution methodology.

Generally, in preparing AuPt alloy NPs or other metastable binary metal alloy NPs of the present invention, the first and second metal elements of the alloy being formed are co-reduced together in the presence of each other. In contrast, in preparing the present Au—Pt heteroaggregate dendritic nanostructures, the first and second metal elements are reduced separately.

Additionally, a strong reducing agent is used to make the AuPt alloy NPs or other metastable binary metal alloy NPs of the present invention for effecting the co-reduction. As used herein the word "strong" means sufficiently strong to reduce both the first and second metal elements simultaneously. Examples of strong reducing agents for co-reduction are n-butyllithium or sodium- or potassium naphthalides. Such reducing agents are commercially available.

An important difference between dendritic and alloy nanoparticles is the following:

1) dendritic NPs are prepared by a sequential reduction method. At first, the Au NPs are prepared, and then the Pt precursors are reduced to a metallic state and deposited onto the Au surface.

2) the alloy NPs are prepared by a co-reduction method. Strong reducing agents, such as butyllithium, co-reduce the Au and Pt precursors to a metallic state and from alloy NPs. A common reducing agent, such as sodium borohydride and polyol, cannot make Au—Pt alloy. Such common reducing agents will first reduce Au, and then Pt because Au precursors are easier to reduce than Pt precursors. Strong reducing agents, such as n-butyllithium reduce Au and Pt precursors together to form metastable Au—Pt alloy NPs.

Generally, the stronger the reducing agent, the lower the temperature required to effect co-reduction and from a colloid. However, both solvent temperature and reducing agent strength are selected in order to effect co-reduction of the first and second metal elements and colloid formation.

Generally, the co-reducing metals are heated together at temperatures in excess of 100° C., and often at temperatures in the range of 200-250° C. The preferred temperatures will vary as a function of which alloy is being prepared. This may easily be done by routine experimentation and readily determined.

After solvent removal by any conventional means, such as rotary evaporation or centrifuge, the resulting dark powder, i.e., usually purple, brown or black, is isolated. If desired, the powdered alloy NPs may be taken up again in a surfactant, such as oleic acid and oleylamine. The above "solution methodology" may be used to make metastable binary metal alloys generally.

The Synthesis of Au—Pt Alloy Nanoparticles.

Generally, the present AuPt alloy nanoparticles, and any other metastable binary metal alloy are made by a solution-based chemical method. AuPt alloy can, and has been, prepared by annealing Au and Pt at temperatures above 1200° C. However, Au—Pt alloy prepared by bulk high temperature methods cannot be made in soluble form and, moreover, has large particle sizes (typically above 100 nm). Such bulk AuPt alloy materials have low activity in heterogeneous catalysis and electro-chemical reactions due to low surface area. In contrast, the AuPt alloy nanoparticles of the present invention have small size of about 2 to 3 nm, which size can be adjusted from 1 nm to 30 nm by changing reaction conditions. As noted, the solution methodology of the present invention can be used to prepare metastable metal alloys generally. In fact, there are many metastable binary metal alloys that cannot be made by conventional methods.

EXAMPLE 1

0.179 mmol $HAuCl_4.xH_2O$ and 0.179 mmol $H_2PtCl_6.xH_2O$ were co-dissolved in 15 ml octyl ether with 1.050 ml oleylamine at 78° C. The solution was then manually injected, via a syringe, into a 78° C. n-butyllithium solution containing 30 ml octyl ether and 1.3 ml 2.0M n-butyllithium cyclohexane solution. A bark brown colloid was formed in several seconds after the solution of Au and Pt precursor was injected. The resulting dark brown colloid was stirred by 30 minutes at 78° C. It was then heated to 230° C. for 2 hours. This dark brown colloid was then cooled to room temperature, and diluted by ethanol followed by centrifuging to deposit NPs. The black powder product was re-dispersed in toluene with suitable amount of oleic acid and oleylamine if needed.

The colloid was then washed with water by centrifugation. The top organic layer was collected, diluted with ethanol, and centrifuged to deposit NPs. The resulting powder was redispersed in toluene with a suitable amount of oleylamine and oleic acid if needed. A part of the colloid was stored in capped vials for UV-visible measurement and preparation of TEM grids. The left colloid was further washed by the above procedure at least four times. The resultant black powdery product was dried in oven at 60° C. for 2 hours, and stored in capped vials for powder X-ray diffraction and X-ray photo-electron spectroscopy measurement.

Characterization of Au—Pt Alloy and Au—Pt Heteroaggregate Nanoparticles.

Figure 11:
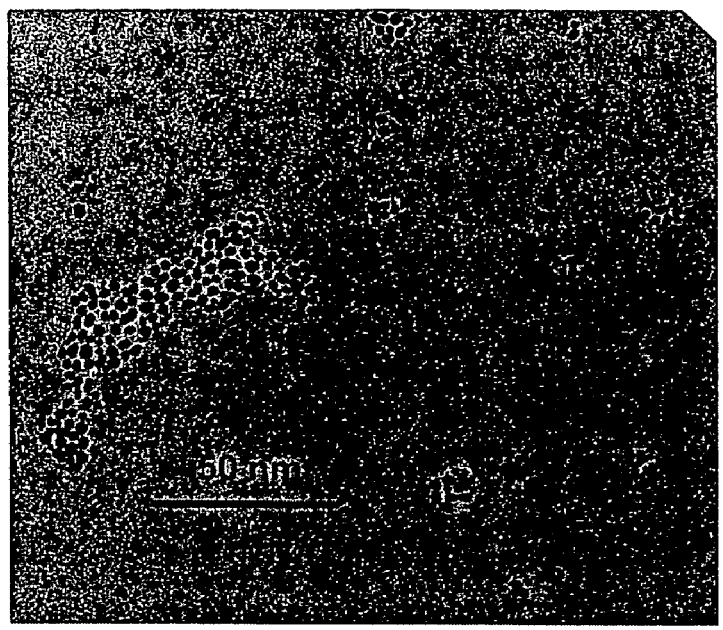
FIG. 11 shows a low magnification TEM image of the present AuPt alloy NPs. These particles show a narrow distribution with an average particle size of 2.5 nm.
Figure 12:
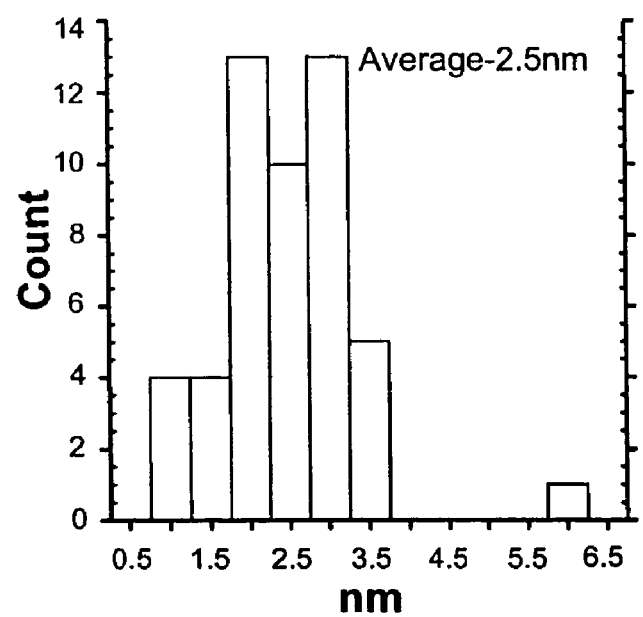
FIG. 12 represents a histogram showing particle size distribution of the present AuPt alloy NPs.
Figure 13:
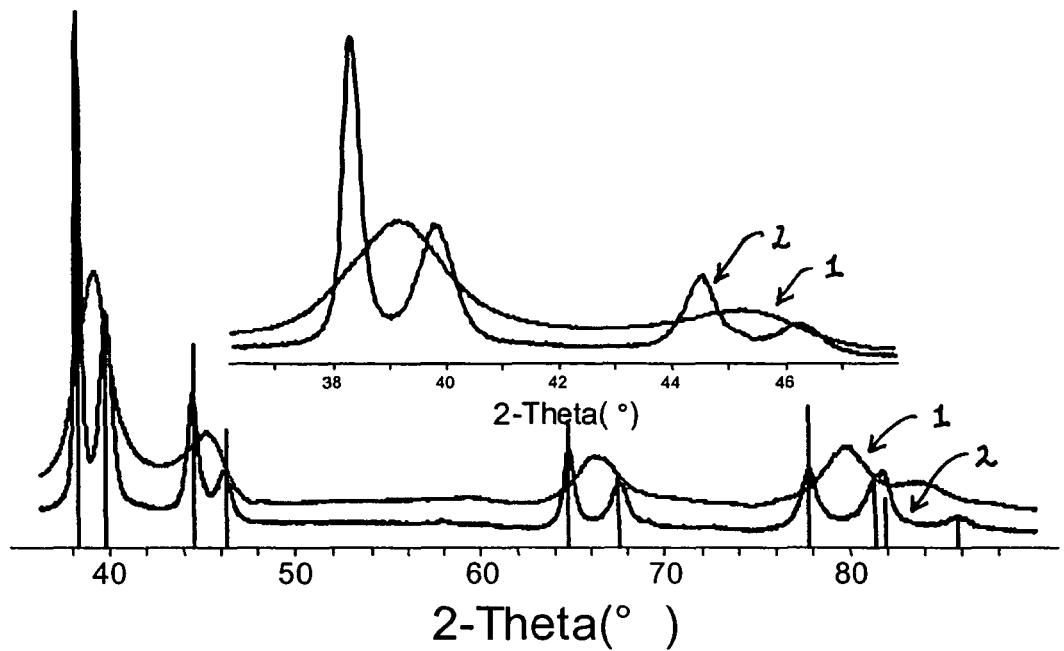
FIG. 13 shows XRD patterns of AuPt systems. Pattern 1 is for AuPt alloy NPs, and pattern 2 is for a physical mixture of Au and Pt NPs. The vertical lines indicate the diffraction from Au (JCPDS 01-1172) (on the left side of each pair), and Pt (JCPDS 01-1311) (on the right side of each pair). The inset (upper pattern) is an enlargement of the XRD patterns.

FIG. 11 shows the low magnification TEM image of AuPt alloy NPs. These particles show a narrow distribution with an average particle size of 2.5 nm. See FIG. 12. XRD measurement of the AuPt NPs exhibits a clear, well defined XRD pattern. FIG. 13. The diffraction peaks of AuPt NPs are just between those of Au and Pt. According to Vegard's law, the XRD pattern is consistent with the pattern of an atom randomly distributed AuPt alloy system.

The upper 2-Theta profile in FIG. 13 is a reduced scale (37-47) of the lower profile (39-84). Importantly, the as prepared sample (non-annealed) shows broad peaks in each profile, whereas the physical mixture sample shows sharp peaks in each profile, indicative of phase separation, i.e., a true alloy. In the lower profile, in each pair of data baselines, Au is on the left, and Pt on the right.

Figure 3:
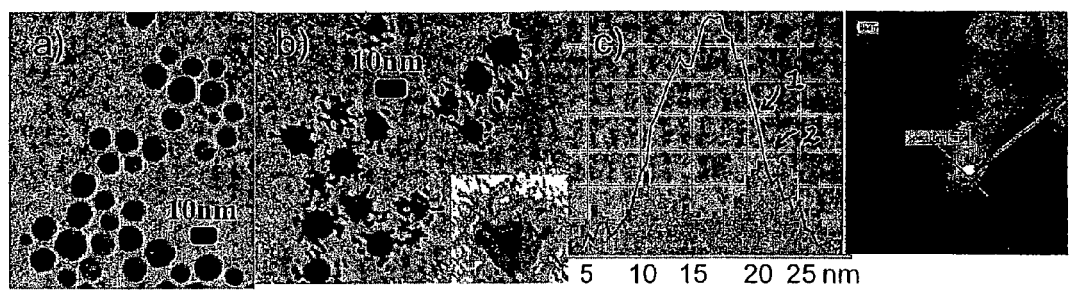
FIG. 3 shows TEM images of a) Au NP (nanoparticle) core particles, b) Au—Pt dendritic aggregates (particle enlargement in inset), c) EELS line scan across the Au—Pt particle showing atomic composition as a function of beam displacement across the particle. Particle center occurs at 18 nm.

The Au NP case particles Au—Pt dendritic heteroaggregate nanoparticles of the present invention may be characterized by transmission electron microscopy (TEM). FIG. 3 shows TEM images of a) Au NP case particles, b) Au—Pt dendritic heteroaggregates, c) Au—Pt particle-EELS line scanned across showing atomic composition as a function of beam (width) displacement across the particle. It is noted that Pt (2) is pronounced on the Au core (1) particle surface, although the particle as a whole is heteroaggregate, and d) shows a beam path for the Au—Pt denndritic heteroaggregate particles with the particle center occurring at about 18 nm.

Notably, the core of each heteroaggregate nanoparticle is Au, whereas the tendrils of each are Pt. The apparent mix of both Au and Pt throughout the cross-section of the nanoparticle is due to the presence of both elements, Au and Pt, in the beam.

Reference will now be made to certain additional Examples which are provided solely for purposes of illustration and are not intended to be limitative.

EXAMPLE 2

Au Nanoparticle Synthesis

Dissolve 0.157 mmol HAu $Cl_4 \cdot XH_2O$ (49.98% Au, Strem), 4.4 ml Oleylamine (70%, Tech., Aldrich) in 26.4 ml Decahydronaphthalene (99+%. Mixture of cis and trans, Sigma-Aldrich), then stir the above solution at 110° C. for 12 hours to form purple colloid. Cool down the above colloid, and add ethanol to deposit nanoparticles which are re-dispersible in toluene.

EXAMPLE 3

Pt Nanoparticle Synthesis

Dissolve 0.157 mmol Pt(acac)$_2$ (97%, Aldrich), 4.4 ml Oleylamine (70%, Tech., Aldrich) in 26.4 ml Decahydronaphthalene (99+%. Mixture of cis and trans, Sigma-Aldrich), then reflux the above solution for 2 hours to form dark colloid. Cool down the colloid, and add ethanol to deposit nanoparticles, which are re-dispersible in toluene.

EXAMPLE 4

Au—Pt Heteroaggre Gate Nanoparticle Synthesis

Dissolve 0.157 mmol HAu $Cl_4 \cdot XH_2O$ (49.98% Au, Strem), 4.4 ml Oleylamine (70%, Tech., Aldrich) in 26.4 ml Decahydronaphthalene (99+%. Mixture of cis and trans, Sigma-Aldrich), then stir the above solution at 110° C. for 12 hours to form purple colloid. Cool down the colloid, and add 0.157 mmol Pt(acac)$_2$ (97%, Aldrich). Reflux the above mixture while stirring for 2 hours to form a dark colloid. Cool down the colloid, and add ethanol to deposit nanoparticles which are re-dispersible in toluene.

EXAMPLE 5

Supported Catalyst Preparation

Supported Au—Pt heteroaggregate catalysts were prepared by impregnating a required amount Au—Pt bimetallic colloid with a required amount of gamma-alumina followed by removing solvent at approximately 70° C. in vacuum. The powder was further washed with acetone and ethanol. The Pt loading of all the catalysts is about 1% (wt %), and the molar ratio of Au to Pt is about 1 to 1.

Preparation of the Supported Au—Pt Heteroaggregate Catalyst with FE Promoter is similar. The required amount of Fe(NO$_3$)$_3 \cdot$9H$_2$O was dissolved in a suitable amount of water. The pre-synthesized 1% by wt. Au—Pt heteroaggregate catalyst was immersed into the stirred Fe(NO$_3$)$_3$ aqueous solution. The solid catalyst powders were obtained by removing the solvent under vacuum. Before activity measurements, the catalyst was reduced by 10% of H$_2$ in Ar at 200° C. for 3 hours. Preferred Pt:Fe ratios are approximately 1:2, however Pt:Fe ratios of about 0.1 to about 10.0 may be used. The ratio of Pt/Au/Fe may be adjusted by changing the ratio of the starting materials.

EXAMPLE 6

Temperature Programmed Oxidation experiments (TPO experiments)

Temperature programmable oxidation was measured by placing the supported catalyst in a packed bed arrangement in a 6.4 mm ID quartz tube centered in a vertical programmable tube furnace. The height of catalyst bed was 5.5 mm. The packed bed consisted of 105 mg of catalyst and supported with 135 mg of 1 μm quartz particles to provide adequate flow through the bed. The bed was held in place by quartz wool above and beneath, which assisted in preheating the gases to the prescribed furnace temperature. Computer controlled electronic mass flow controllers were used to vary flow rates to fix reactor residence times and reactor gas velocity (0.21 m/s). The reactant mixture contained 50% H$_2$, 0-0.2% CO, 0.2-0.5% O$_2$ with an Ar balance. Product gases were measured continuously with a carefully calibrated magnetic sector mass spectrometer (Thermo Prima 8B). Product compositions were determined from the calibrated sensitivities and ion cracking patterns for the analyzed gases. See FIGS. 8 and 9.

EXAMPLE 7

Analysis by Instrumentation

Figure 7A:
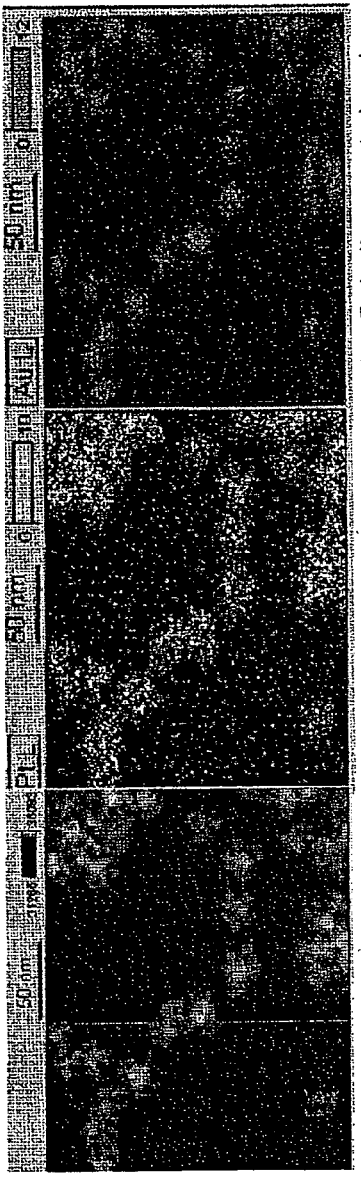
FIG. 7a shows STEM images for Au—Pt heteroaggregate particles (left), Pt (center) and Au (right) phase maps. The data shows that the heteroaggregate particles have Au cores and Pt appendages or tendrils.

Compositional phase maps were acquired using the Hitachi HD-2300 200 kV dedicated FE-STEM with an EELS attachment and EDX detector with high sensitivity. Due to the unique large solid angle, 2 nm spatial resolution is attainable in a relatively short time. See FIG. 7(a).

Figure 6:
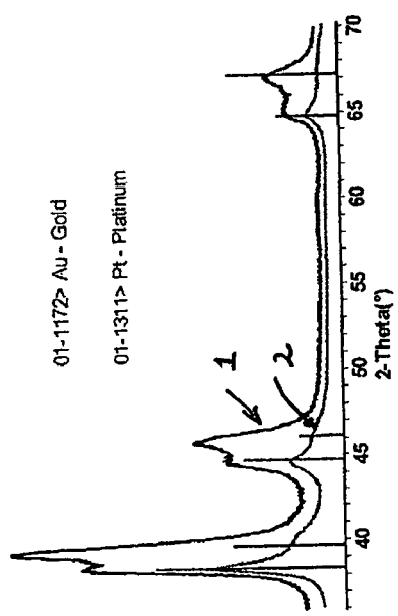
FIG. 6 illustrates XRD data for Au—Pt heteroaggregate NPs.
Figure 7B:
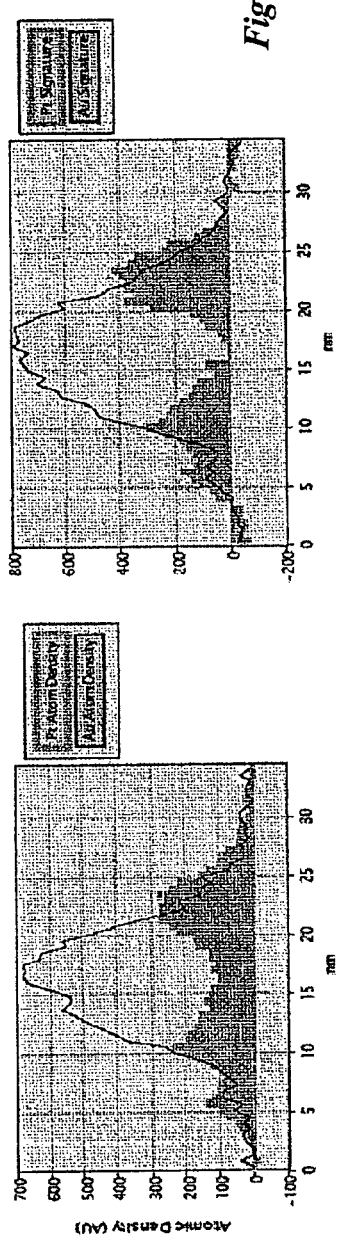
FIG. 7b shows EELS of heteroaggregate NPs data for both Au and Pt atomic densities (left) and low loss EELS signatures (right).

Single particle EELS analysis was acquired using HD-2300 coupled with Gatan Enfina spectrometer. The high brightness of the HD2300 coupled with the high efficiency of the Gatan Enfina spectrometer allows analysis of high energy edges with a sub-nanometer (less than 0.5 nm) probe. See FIG. 7(b). In FIG. 7(b), the trace of the parabola corresponds to Au, and the shaded-area underneath is Pt. XRD data were collected using a Bruker C2 Discover diffractometer equipped with a HiStar detector. See FIG. 6. In FIG. 6, the upper or top profile curve (1) corresponds to the annealed heteroaggregate, whereas the lower profile corresponds to the "as prepared" (non-annealed) heteroaggregate. In each pair of baselines, Au is the one on the left, and Pt on the right.

The present invention has occurred, at least in part, as a consequence of further investigation of the Au@Pt system which has led to the discovery of a novel nanoparticle architecture when depositing Pt on Au nanoparticle cores, i.e., a heteroaggregate structure comprising Au cores with Pt "tendrils" emanating from the surface as illustrated in TEM images.

Monometallic Pt (5 nm) and Au (11 nm) nanoparticles were prepared by employing minor modifications of published procedures. The Au—Pt heteroaggregate particles were prepared using modified standard procedures for sequential core-shell particle growth. The Au core was prepared by reducing $HAuCl_4$ in a decahydronaphthalene/oleylamine mixture (~6:1, v:v) at 110° C. for 12 h. The resulting purple colloidal solution was cooled to room temperature, charged with $Pt(acac)_2$ (1:1, Pt:Au) and refluxed for an additional 2 h. The Pt—Au particles were precipitated from the resulting dark colloidal mixture (ethanol and centrifugation), washed (acetone) and re-suspended in toluene. All supported catalysts were prepared by depositing the nanoparticles onto $\gamma$-$Al_2O_3$ support particles (3 micron in diameter) such that catalyst loadings were 1.0 wt % Pt.

The Au—Pt heteroaggregate nanoparticles have been characterized by XRD, EDX, TEM, STEM phase mapping and EELS single particle analysis. FIG. 3 shows that the Au nanoparticle precursor is identical in size to the heteroaggregate core structures thereby indicating the dendritic tendrils are formed by the deposition of Pt metal. This heteroaggregate structure is architecturally distinct from the bimetallic and core-shell AuPt systems previously reported, and XRD patterns of the "as prepared" nanoparticles showed non-alloyed Au peaks with shoulders arising from the Pt tendrils. Annealing the sample at 400° C. for 3 h crystallizes the Pt components to give well-defined Pt and Au diffraction patterns (FIG. 6). STEM phase mapping (FIG. 7(a)) is also consistent with dendritic Pt tendrils extending from the Au core but the overlap in the X-ray lines complicates the interpretation. Definitive evidence of the Au core/Pt tendril structure is seen in the EELS line scans across individual heteroaggregate particles (FIG. 7(b)). The data show that the core is essentially pure Au whereas the Pt density is concentrated at the periphery of the particles. This structure contrasts typical core-shell seeded growth mechanisms but is consistent with the PtAu phase diagram. The aggregate structure and the lack of any monometallic particles in the colloidal suspension strongly suggest that Pt growth is templated on the Au surface.

The dendritic heteroaggregate structure of the current Au—Pt system gives rise to anomalous catalytic properties not observed in any of the other monometallic or bimetallic architectures. Temperature-programmed reactor experiments (TPR) for oxidation of CO-contaminated $H_2$ fuels were conducted to estimate the potential of the Au—Pt heteroaggregates for low-temperature $H_2$-electrooxidation in the presence of CO. The activity tests were performed with CO concentrations as high as 0.2%. The Au—Pt heteroaggregates were compared against monometallic Pt catalyst (5 nm NPs, 1% loading). The results show that the activity on pure Pt particles is significantly impeded by the 2000 ppm CO impurity, raising the $H_2$ light-off temperature from 50° C. to 175° C. In contrast, the Au—Pt heteroaggregate catalyst lights-off at 105° C. in the presence of 2000 ppm CO.

EXAMPLE 8

Single Particle Composition Analysis

Figure 14:
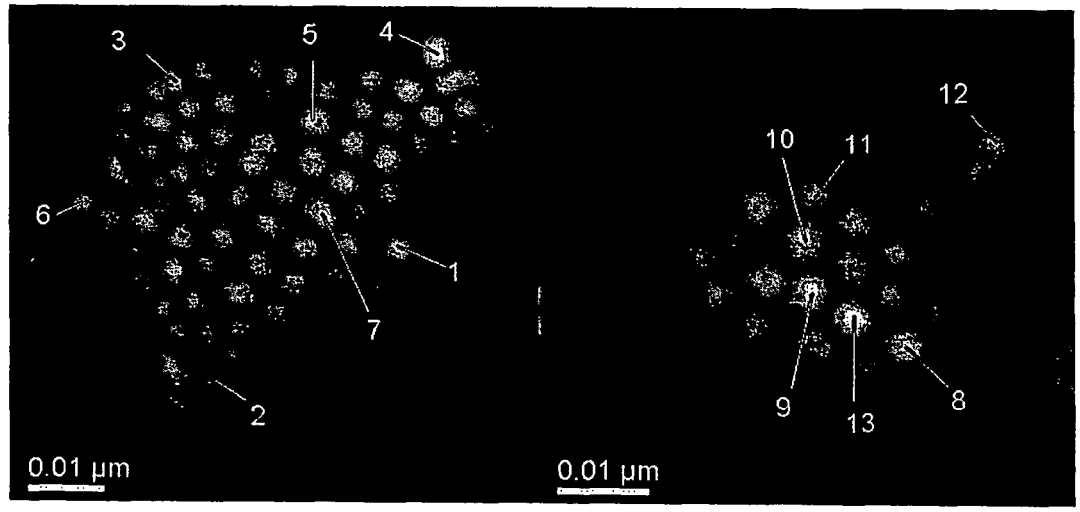
FIG. 14 shows dark field images in a sample grid. 13 particles were randomly selected for EDS analysis. The selected particles are numbered as shown in the Figure using the same numbers in Table 1 of the specification.

Thirteen (13) individual AuPt alloy nanoparticles produced using the methodology of Example 1 and selected as shown in FIG. 14 were compositionally analyzed. The compositional analysis of each AuPt alloy NP is shown below.

TABLE 1

Single particle composition analysis of 13 AuPt alloy nanoparticles.

| # of particle | Pt % (atomic concentration) | Au % (atomic concentration) |
|---|---|---|
| 1 | 45.9 | 54.1 |
| 2 | 48.8 | 51.2 |
| 3 | 49.5 | 50.5 |
| 4 | 67.1 | 32.9 |
| 5 | 28.6 | 71.4 |
| 6 | 55.5 | 45.5 |
| 7 | 43.0 | 57.0 |
| 8 | 26.0 | 74.0 |
| 9 | 43.3 | 56.7 |
| 10 | 49.5 | 50.5 |
| 11 | 53.0 | 47.0 |
| 12 | 65.8 | 34.2 |
| 13 | 35.8 | 64.2 |

Figure 15:
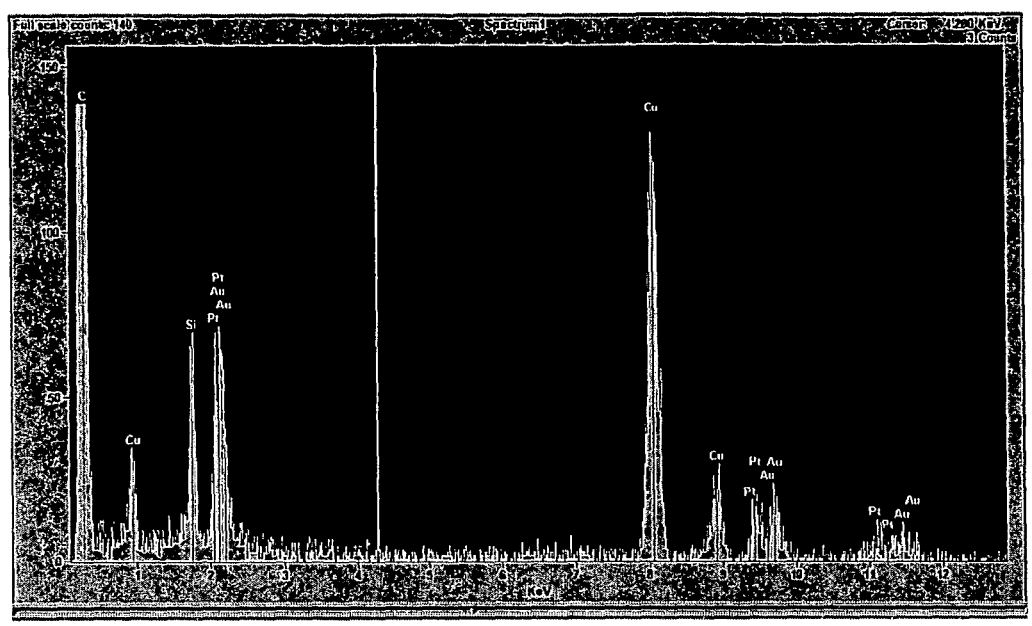
FIG. 15 is a representative EDS spectrum of one AuPt alloy nanoparticle.

FIG. 15 is a representative EDS spectrum of one AuPt alloy nanoparticle. The presence of Cu and Si are due to container and matrix, respectively. Importantly, the EDS spectrum shows that the AuPt alloy NP contains both Au and Pt.

EXAMPLE 9

The Catalytic Performance of Au—Pt Heteroaggregate Particles with FE Promoter and Au—Pt Alloy Nanoparticles without Fe Promoter.

To keep a constant residence time of the reactants at different temperatures, the velocity of the reactant mixtures were fixed at 0.2085 m/s by varying reactant flow rates with reaction temperatures. The ramping rate of reactor furnace is 2° C./minute. To simulate the CO contaminated $H_2$ fuel, the reaction stream was adjusted too give 50% $H_2$, 0.5% $O_2$, 0.2% CO and 49.7% Ar. The yields of $H_2O$ and $CO_2$ are based on $O_2$ the limiting reactant. Therefore, the maximum yield of $H_2O$ is 100% if all the $O_2$ is converted to $H_2O$, and the maximum yield of $CO_2$ is 20%. The sum of the yield of $H_2O$ and $CO_2$ is equal to the $O_2$ conversion. For clarify, the percent of maximum concentration is used instead of yield in FIGS. 8 and 9. The present of maximum concentration is calculated by dividing the real concentration by the maximum concentration. For example, at certain temperature with an $O_2$ conversion of 70%, a yield of $H_2O$ of 60% and a yield of $CO_2$ of 10%, the percent of maximum concentration of CO is 50% (10/20), and the percent of maximum concentration of $H_2O$ is 60% (60/100). For $O_2$, the percent of maximum concentration of $O_2$ is 30% (100-70)/100).

Figure 8:
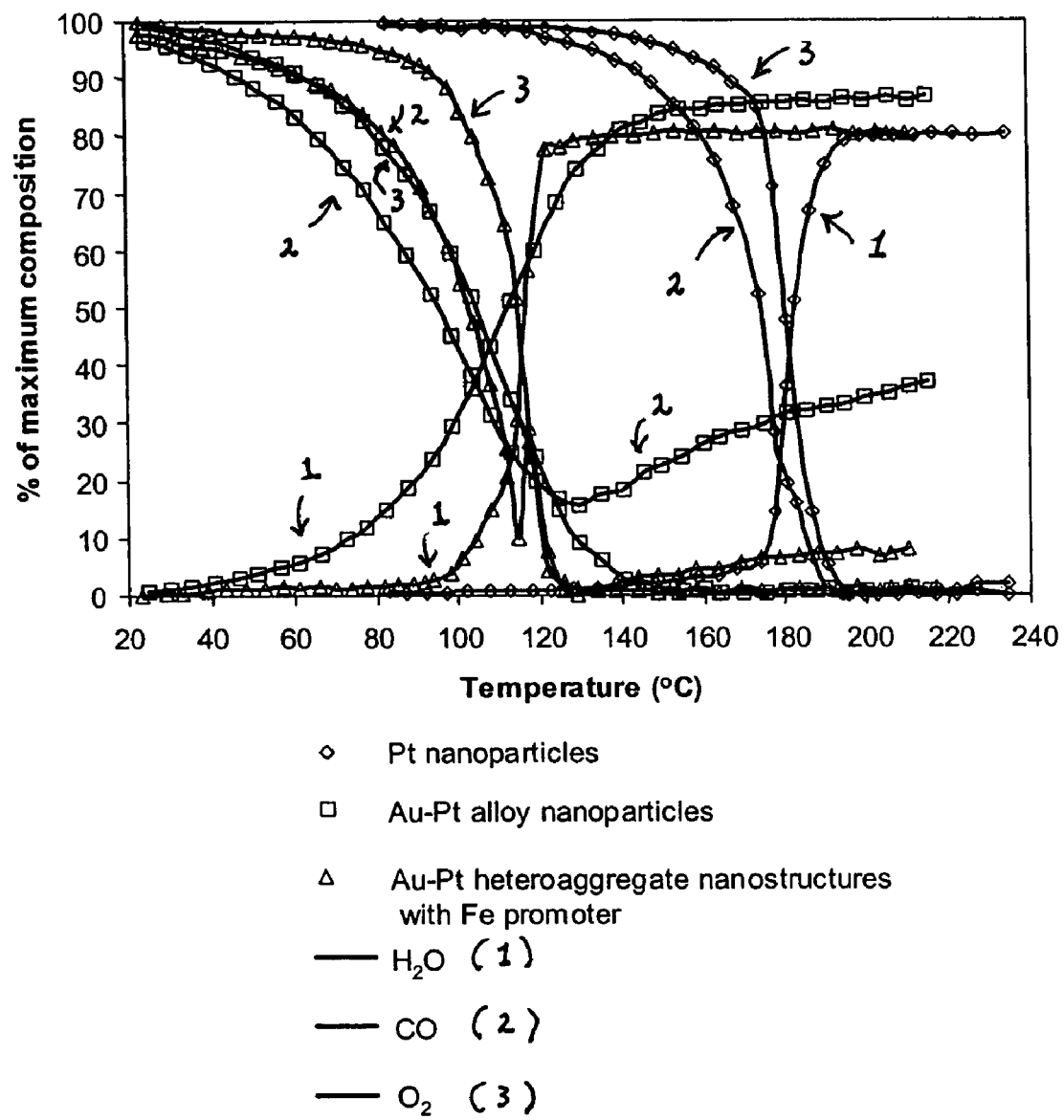
FIG. 8 comparison of temperature programmable reactions of alumina supported Pt nanoparticles, Au—Pt heteroaggregate with Fe promoter, and Au—Pt alloy nanoparticle catalysts for $H_2$ oxidation in $H_2/CO/O_2/Ar$ fuel streams (50:0.2: 0.5:49.3) and fixed flow rate (0.2085 m/s) in reactor. CO is normalized to inlet composition. $H_2O$ composition is normalized with respect to $H_2O$ generated if the limiting reactant $O_2$ were completely converted to $H_2O$. The Pt loading is 1.0% (wt %) for all three catalysts. For Au—Pt alloy nanoparticle catalyst, the ratio of Au/Pt (wt/wt) is 1/1. For Au—Pt heteroaggregate nanostructure with Fe promoter catalyst, the ratio of Au/Pt/Fe is 1/1/4, and the Fe promoter is $Fe(NO_3)_3$.

FIG. 8 shows temperature programmable $H_2$ oxidations of pure Pt nanoparticle, AuPt alloy nanoparticle, and Au—Pt heteroaggregate nanostructure with $Fe(NO_3)_3$ catalysts in the presence of 2000 ppm CO. The pure Pt nanoparticle catalyst shows a 175° C. lightoff temperature and a 195° C. completion temperature for water formation, while without CO, the lightoff temperature is 50° C. and completion temperature is 60° C. The result is consistent with the poisoning model of CO. CO strongly binds to the Pt surface, and inhibits $H_2$ and $O_2$ adsorption onto the surface. When the temperature reaches 140° C., CO begins to desorb from the surfaces, and $H_2$ and CO oxidation begins to take over. The mixture of Au and Pt nanoparticle shows only a slightly lower lightoff temperature compared to the pure Pt catalyst. This result is as expected considering the particle size of Au NPs (for CO oxidation, a particle size less than 4 nm is required for Au catalysts). The performance of the AuPt heteroaggregate nanostructures with $Fe(NO_3)_3$ is significantly better comparable to that of the pure Pt nanoparticle catalyst.

The CO conversion and oxygen conversion reaches 100% at 125° C., which is 70° C. lower than those of the pure Pt nanoparticles catalyst. The AuPt alloy nanoparticle catalyst shows more than 50° C. enhancement compared to the pure Pt nanoparticle catalyst. The hydrogen oxidation and CO oxidation are initiated together, and water formation starts from 40° C. The maximum CO conversion of alloy catalyst is 85%, and when the temperature is above 126° C., the CO conversion decrease as the temperature increases. The Au—Pt alloy nanoparticle catalyst and Au—Pt heteroaggregate nanostructure with Fe promoter catalyst show significant CO tolerance compared to the pure Pt nanoparticle catalyst. These two catalysts are catalysts which provide a viable alternative to commercial Pt fuel cell anodes that cannot tolerate CO contaminated hydrogen fuels.

Figure 9:
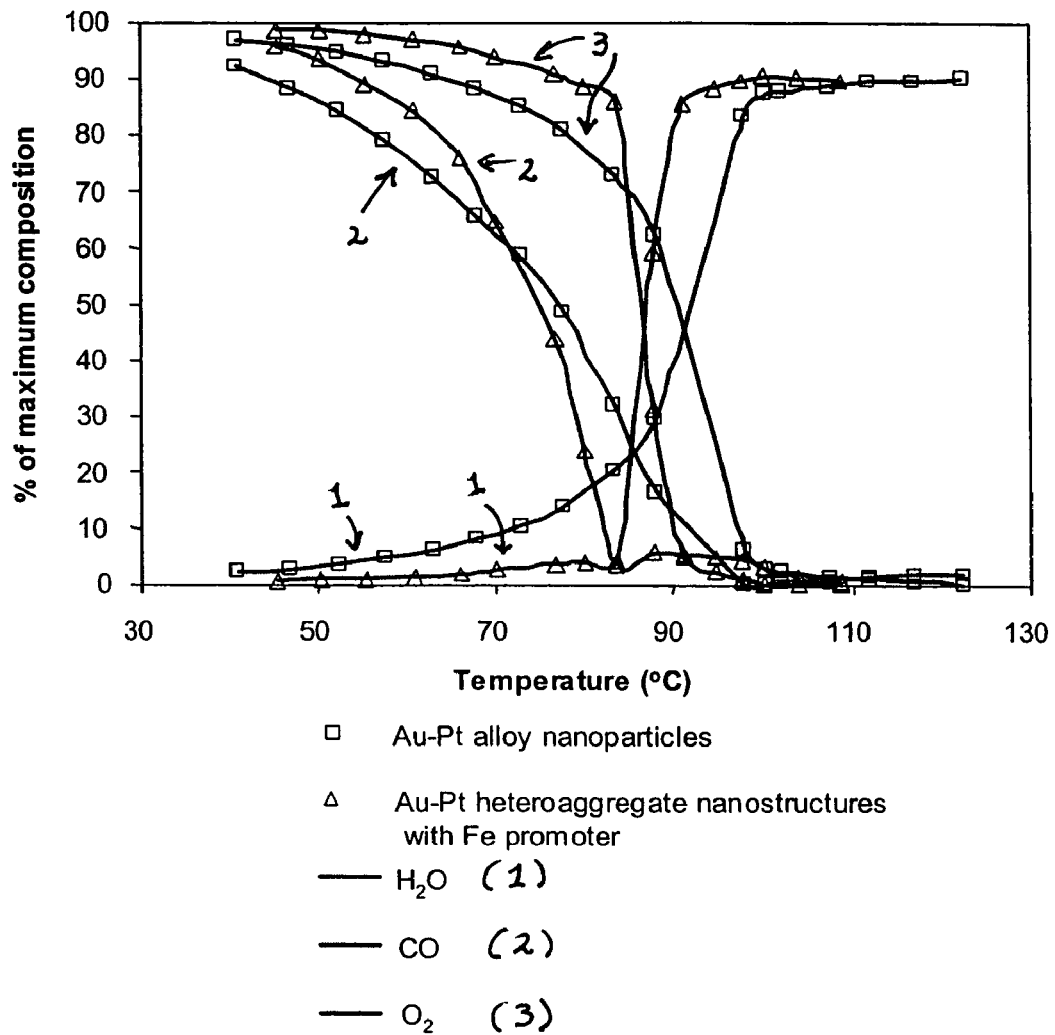
FIG. 9 comparison of temperature programmable oxidation reactions of the Au—Pt heteroaggregate nanostructure using the steel-CO cylinder (containing trace $Fe(CO)_5$) and Au—Pt alloy nanoparticle catalyst using Fe-free tank for hydrogen oxidation in $H_2/CO/O_2/Ar$ fuel streams (50:0.2:0.5: 49.3) and fixed flow rate (0.2085 m/s) in reactor. CO and $O_2$ are normalized to inlet composition. $H_2O$ composition is normalized with respect to $H_2O$ generated if the limiting reactant $O_2$ were completely converted to $H_2O$.

FIG. 9 shows temperature programmable H2 oxidations with AuPt alloy nanoparticles and Au—Pt heteroaggregate dendritic nanostructures with Fe promoter ($Fe (NO_3)_3$) in the presence of 1000 ppm CO. The performance of the latter is much better than pure Pt and comparable with the AuPt alloy catalyst without an Fe promoter.

Nevertheless, the Au—Pt heteroaggregate dendritic nanostructures and Au—Pt alloy nanoparticles of the present invention may be used advantageously at the anode site in hydrogen fuel cells, and, in particular, in PEM fuel cells. Hence, the present specification specifically contemplates a hydrogen fuel cell containing, at an anode site, the Au—Pt heteroaggregate dendritic nanostructures of the present invention.

Generally, procedures for the design and manufacturing of PEM fuel cells, particularly in the context of vehicle application, are well known. For example, see Journal of Power Sources, 2003, Vol. 114, no 1, pp. 32-53 (ISSN 0378-7753), wherein Mehta and Cooper review many alternatives, including 16 polymer electrolyte membrane, 2 types of gas diffusion layers (GDL), 8 types of anode catalysts, 4 types of cathode catalysts and over 100 bipolar plate design are recommended for further study. This article not only reviews membrane electrode assembly manufacturing options and synthesis processes for many of the membranes and for the gas diffusion layers, but also adds to the bipolar plate fabrication options described in literature. See also U.S. Pat. Nos. 7,135,131; 7,132,193; 7,115,333 and 7,056,613, each of which are incorporated herein by reference in the entirety.

The Au—Pt dendritic heteroaggregate nanoparticles and Au—Pt alloy nanoparticles of the present invention may be used as an anode material with any or all known combinations of polymer electrolyte membranes, gas diffusion layers, cathode catalysts and bipolar plate designs to form a PEM fuel cell device. Moreover, an anode material containing the present Au—Pt dendritic heteroaggregate nanoparticles may be prepared using any conventional methodology.

For example, the present nanoparticles may be supported on a high surface area carbon support, polymer support or inorganic support, such as a gamma-alumina support. Generally, the present nanoparticles are suspended in aromatic hydrocarbon solvent and mixed with a slurry of polymer or carbon in aromatic hydrocarbon solvent. After at least one hour, the solvent is evaporated and the supported anode material is washed and dried at room temperature under vacuum, i.e., at least about $10^{-3}$ m bar. Generally, catalyst loads of up to about 5% by wt. may be attained, however, loads of 1 to 2% by wt. are acceptable. The resulting material may then be affixed at the anode site of PEM fuel cell devices by a conventional adhesive material.

Figure 4:
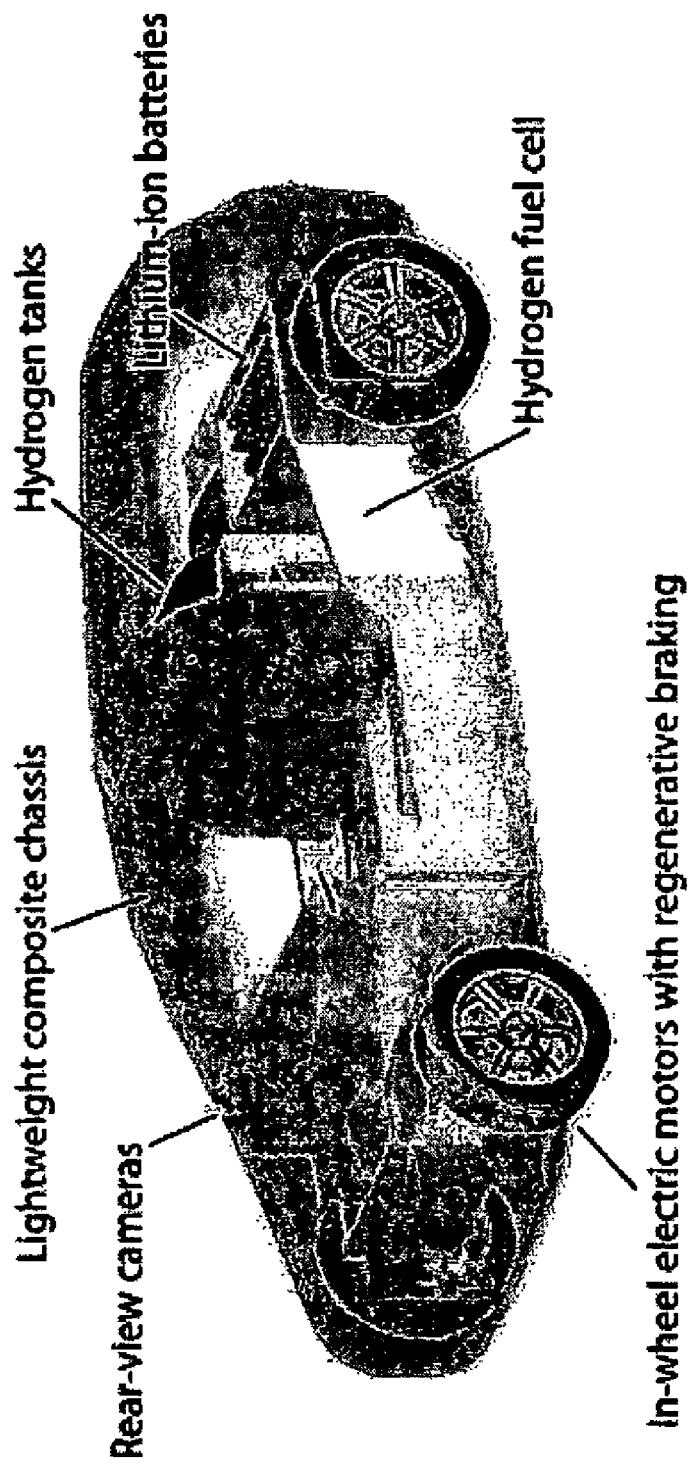
FIG. 4 illustrates a schematic of a hydrogen fuel cell-powered automobile.

Additionally, the present invention also provides vehicles that are powered by one or more hydrogen fuel cells, particularly PEM fuel cell devices, having at anodes sites thereof the Au—Pt dendritic heteroaggregate nanostructures of the present invention. For example, the vehicle may be a passenger vehicle, such as a car or a bus. However, the vehicle may also be a truck which hauls freight. See, for example, U.S. Pat. No. 7,086,492, which is incorporated herein in the entirety. See also FIG. 4.

While hydrogen fuel cells have a cathode and an anode like a battery, batteries wear out whereas hydrogen fuel cells, like all fuel cells, are able to continue to function and produce clean energy provided that an external fuel source remains available.

Additionally, hydrogen fuel cells, particularly PEM fuel cells, may be used to power aircraft or even chemical plants. For example, General Motors has furnished a fuel cell trailer to power a Dow Chemical Company plant in Freeport, Tex. See, for example, U.S. Pat. No. 7,081,687, which is incorporated herein in the entirety by reference.

Generally, a plurality of hydrogen fuel cells are "stacked" together in order to provide sufficient energy to power a vehicle. Dozens, and even hundreds, of hydrogen fuel cells may be "stacked" for this purpose.

Many companies are currently researching the feasibility of building hydrogen cars. Funding has come from both private and government sources. In addition to the BMW and Mazda examples cited above, many automobile manufacturers have begun developing cars. These include:

BMW—The 750HL is powered by a dual-fuel Internal Combustion Engine and with an Auxiliary power based on UTC Power fuel cell technology. The BMW H2R speed record car is also power by an ICE. Both models use Liquid Hydrogen as fuel.

Daimler Chrysler—F-Cell, a hydrogen fuel cell vehicle based on the Mercedes-Benz A-Class.

Ford Motor—Focus FCV, a hydrogen fuel cell modification of the Ford Focus.

General Motors—multiple models of fuel cell vehicles including the Hy-wire and the HydroGen3.

Honda—currently experimenting with a variety of alternative fuels and fuel cells with experimental vehicles based on the Honda EV Plus, most notable the Honda FCX.

Hyundai—Tucson FCEV, based on UTC Power fuel cell technology.

Mazda —RX-8, with a dual-fuel (hydrogen or gasoline) rotary-engine.

Nissan—X-TRAIL FCV, based on UTC Power fuel cell technology.

Morgan Motor Company—LIFEcar, a performance-oriented hydrogen fuel cell vehicle with the aid of several other British companies.

Toyota—The Highlander FCHV and FCHV-B US are currently under development and in active testing.

Volkswagen also has hydrogen fuel cell cars in development.

By way of further examples, the anode material of the present invention may be used in conjunction with any of the PEM fuel cell devices disclosed in U.S. Pat. Nos. 6,030,718, and 6,218,035 both of which are incorporated herein in their entirety.

Figure 5A:
FIG. 5a shows photomicrographs of each of Au and Pt nanoparticles, and the Au—Pt heteroaggregate dendritic nanostructures of the present invention.
Figure 5B:
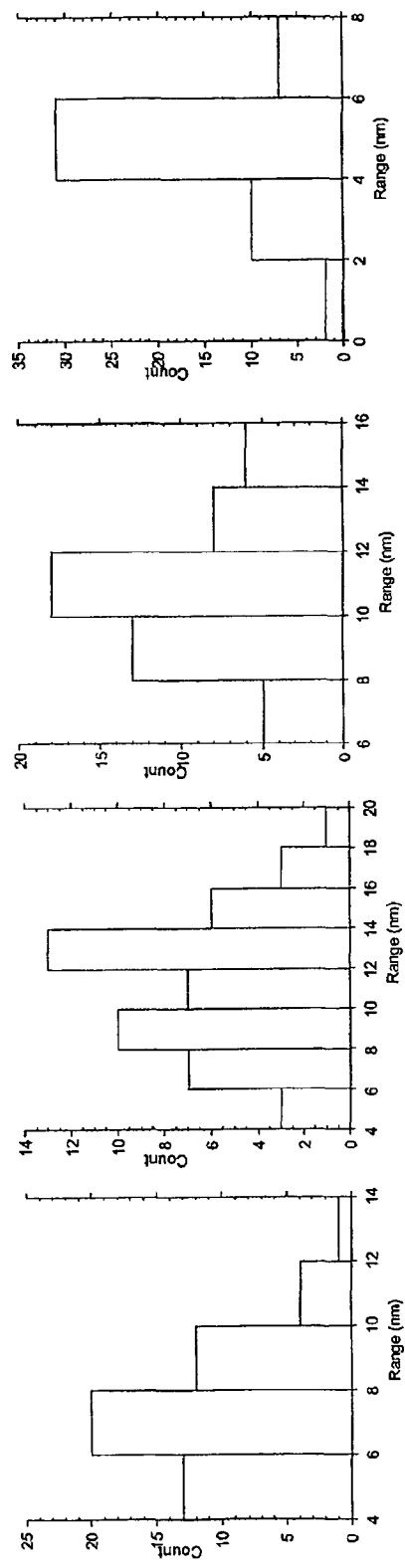
FIG. 5b illustrates a particle size (nm) distribution as a function of counts for each of i) Au—Pt (Pt tendrils), ii) Au—Pt (Au core), iii) Au and iv) Pt as prepared.

Vehicles powered by the hydrogen fuel cell of the present invention may also be powered by solar panels and/or lithium-ion batteries as well. FIG. 5 illustrates an example of such multiple power sources using both hydrogen fuel cells and lithium-ion batteries.

The chassis of the vehicles of the present invention may be constructed of any conventional material, such as aluminum, however, it is generally preferred that the vehicle be constructed of strong, but lightweight materials. Preferably, the internal chassis of the car is built from aluminum honeycomb, which is strong but very lightweight because there are gaps within its structure (like a real honeycomb). The shell of the car is preferably made from lightweight carbon fibers, and is designed to be highly aerodynamic.

For storage of hydrogen for use by the present vehicle, it is generally advisable to use one or two high-pressure cylinders of hydrogen, similar to the gas cylinders used in the back of LPG-powered cars. Although there are other more exotic ways of storing hydrogen which allow more gas to be stored in a smaller area, such as by the formation of metal hydrides, using normal cylinders makes it easier to refuel from companies that sell hydrogen gas.

There are several human ways in which to generate hydrogen for subsequent use in a hydrogen fuel cell, particular a PEM fuel cell. For example, hydrogen may be generated by the reaction of acids upon metals; removal of hydrogen from hydrocarbons, such as in the reaction of methane (natural gas) and water vapor; or even by certain microorganisms. As an example of such microorganisms, see http://www.sciencenews.org/articles/200021012/bob11.asp. In fact, hydrogen may be generated by a variety of known methodologies.

The hydrogen generated may be stored in a variety of known ways as well. For example, hydrogen may be stored using clathrates, metal hydrides or carbon-metal hybrid compositions. See, for example, U.S. Pat. Nos. 6,596,055; 6,589, 312; 6,419,764 or 6,342,198, each of which is incorporated herein in the entirety. However, hydrogen may also be stored as a compressed gas or liquids. Hydrogen gas is stored in a compressed gas tank, while hydrogen liquid is stored in a cryogenic gas tank.

Compressed hydrogen tanks 5000 psi (~35 MPa) and 10,000 psi (~70 MPa) have been certified worldwide according to ISO 11439 (Europe), NGV-2 (U.S.), and Reigikigun Betten (Iceland) standards and approved by TUV (Germany) and The High-Pressure Gas Safety Institute of Japan (KHK). Tanks have been demonstrated in several prototype fuel cell vehicles and are commercially available. Composite, 10,000-psi tanks have demonstrated a 2.35 safety factor (23,500 psi burst pressure) as required by the European Integrated Hydrogen Project specifications.

Liquid hydrogen ($LH_2$) tanks can store more hydrogen in a given volume than compressed gas tanks. The volumetric capacity of liquid hydrogen is 0.070 kg/L, compared to 0.030 kg/L for 10,000 psi gas tanks.

Liquid tanks are currently being demonstrated in hydrogen-powered vehicles and a hybrid tank concept combining both high-pressure gaseous and cryogenic storage in being studied. These hybrid (cryo-compressed tanks) insulated pressure vessel are lighter than hydrides and more compact than ambient-temperature, high pressure vessels. Because the temperatures required are not as low as for liquid hydrogen, there is less of an energy penalty for liquefaction and less evaporative losses than for liquid hydrogen tanks.

Figure 10:
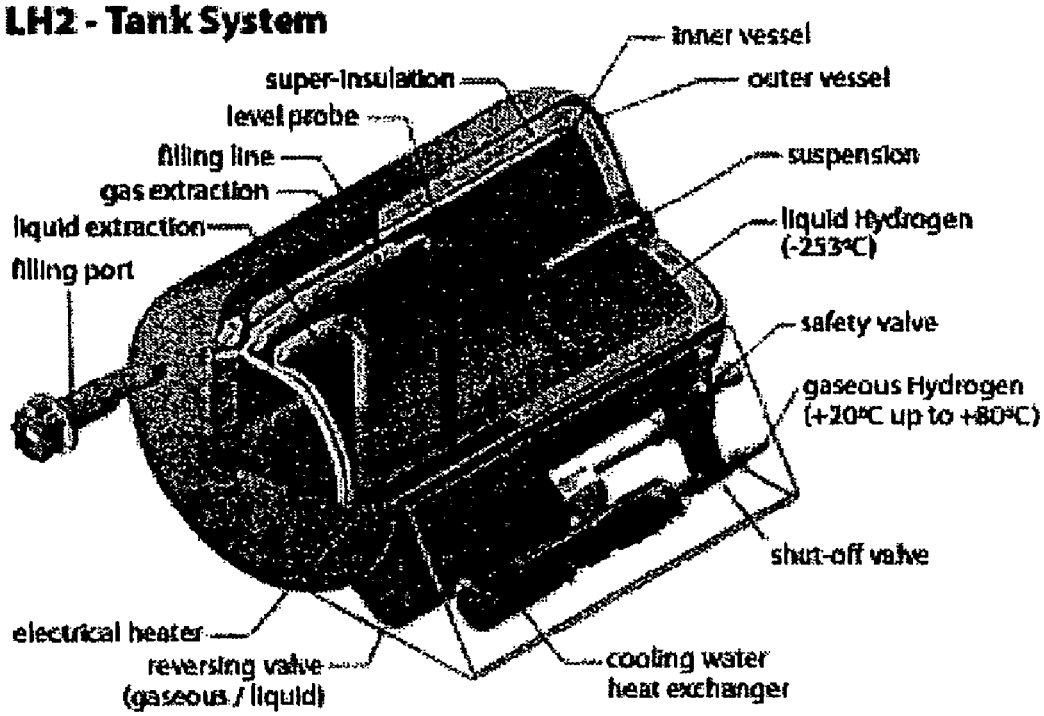
FIG. 10 illustrates a liquid hydrogen ($LH_2$) storage tank for use in a hydrogen-powered vehicle.

FIG. 10 illustrates a state of the art cryogenic liquid hydrogen (LH2) tank system which may be used in a hydrogen vehicle. The components thereof are indicated as shown in the Figure.

Retail availability of hydrogen fuel is expected to increase as more hydrogen fueling stations open in the U.S. For example, in 2004, a retail hydrogen fueling station opened in Washington, D.C. as a result of a partnership between Shell and General Motors to develop hydrogen-fueled vehicles on a commercial scale. Both compressed and liquid hydrogen refueling are available.

The state of Maryland is also pursuing development of a hydrogen fueling station and industrial park where all of the buildings are powered by hydrogen. See http://www.gm.com/company/gmability/alv_tech/400 fcv/fc_milestones.html.

Contrary to common belief, hydrogen stored in cylinders is actually safer than stored gasoline in the tank in a normal car, since the thick metal of the tank is extremely strong.

Most cars have their engine in the front, or sometimes the back, and have a crankshaft to transfer torque from there to the wheels. This system is relative by inefficient and adds to the weight of the car. One approach to avoid this inefficiency is to employ electric motors in the wheels themselves.

In addition, those motors will also act as the car's brakes, turning into electric generators when the car slows down. This is known as regenerative braking, and will help to save energy that would be lost as heat had normal-style brakes been used.

Vehicular systems don't always produce the right amount of power as required. For example, if a vehicle is driven slowly in sunny conditions, solar panels produce extra power that isn't needed at the time. Alternatively, if it is necessary to drive up a steep hill, more power may be needed than fuel cells can produce.

To smooth out these peaks and troughs in power usage, a vehicle may store excess energy in lithium-ion batteries (the same kind of lightweight battery used in mobile phones and laptop computers). If more energy is produced than is needed at any time, excess energy may be stored in the batteries for use on an as needed basis.

Hydrogen fuel cells, particularly PEM fuel cells, may also be used to power boats and ships. See, for example, www.haveblue.com. They have also been used to power breweries.

The hydrogen fuel cells, particularly PEM fuel cells, of the present invention may be advantageously used generally as a mobile or portable power source for any application where batteries or generators have been conventionally used.

Generally Methodology for the Preparation of Metastable Metal Alloys

As noted above, the present invention also provides a general solution methodology for the preparation of metastable metal alloys.

The present solution methodology may be used to prepare any metastable metal alloy, preferably binary alloys. For example, metastable binary metal alloys which may be prepared using the solution methodology of Example 1 are AuNi, AuW, AuRh and PtW. These metastable alloys may be used as catalysts and in organic reactions where the same elements have been used as catalyst.

Generally, for any metastable binary metal alloy of first and second metal elements, the following procedure may be used.

First, soluble salts or organic complexes of the first and second metal elements are co-dissolved and co-reduced with a strong reducing agent in hydrocarbon solvent or other inert at a temperature sufficient to form a colloid.

Generally, salts may include, nitrates or chlorides, for example; while organic complexes may be carbonyls or cyclopentadienyl-type compounds, for example. Exemplary metals are Mn, Ce, Ti, Fe, Co, Ni, V or even Cr. As a hydrocarbon solvent, generally aromatic hydrocarbons, such as benzene, toluene or xylene, or decahydronaphthalene are used. A strong reducing agent, such as n-butyllithium, is used. The co-dissolution and co-reduction are conducted at a solvent temperature sufficient to form a colloid. Generally, temperatures of at least about 50° C. are used, however, temperatures in excess of 100° C. may be required. If necessary, temperatures of as high as 200-250° C. may be used. While hydrocarbon solvents are generally used, such as decahydronaphthalene, other solvents may be used provided they are inert and have a suitable boiling point.

Second, after colloid formation; usually dark in appearance, the colloid is cooled at room temperature and then diluted with a polar organic solvent, such as a lower alkyl alcohol or lower alkyl ketone. Thereafter, solvent is removed and the resulting powder is isolated. Exemplary polar solvents for dilution are ethanol, isopropyl alcohol, acetone or even diethylether. The polar solvent may be removed by rotary evaporation or by centrifuge, for example.

Third, if desired, the resulting metastable binary metal alloy formed may be redispersed in oleic acid and oleylamine. However, any conventional surfactant may be used.

Additionally, the Au—Pt alloy nanoparticles and the Au—Pt heteroaggregate dendritic nanostructures of the present invention may be used also in preferential oxidation of CO in $H_2$ feeds (PROX), oxidation-reduction reactions (ORR) for fuel cell cathodes as well as general organic oxidations, such as alcohol oxidations. See, for example, *Science,* 311, 362 (2006); "Solvent-Free Oxidation of Primary Alcohols to Aldehydes Using Au—Pd/TiO," Enache, D. et al.

Furthermore, both the alloy nanoparticles and heteroaggregate dendritic nanostructures of the present invention may be used at the anode sites of PEMS, direct methanol fuel cells (DMFC) and phosphoric acid fuel cells, for example.

Having described the present invention, it will now be apparent that many changes and alterations may be made to the above-described embodiments without departing from the spirit and scope of the present invention.

What is claimed is:

1. A method of preparing metastable binary alloy nanoparticles comprising first and second metallic elements, which method comprises:
    a) co-dissolving and co-reducing soluble salts of said first and second metallic elements in an inert solvent using a reducing agent sufficiently strong to simultaneously co-reduce said soluble salts of said first and second metallic elements at a temperature sufficient to form a metastable binary alloy colloid;
    b) cooling the formed metastable binary alloy colloid to ambient temperature; and
    c) diluting the colloid with a polar organic solvent to deposit metastable binary metal alloy nanoparticles.

2. The method of claim 1, wherein said first metal is Au, and said second metal is Pt.

3. The method of claim 1, wherein said first metal is Au, and said second metal is Ni.

4. The method of claim 1, wherein said inert solvent is a hydrocarbon.

5. The method of claim 4, wherein said hydrocarbon is decahydronaphthalene.

6. The method of claim 1, wherein the polar organic solvent is ethanol.

7. The method of claim 1, wherein all solvent is removed by centrifuge.

8. The method of claim 1, wherein said temperature sufficient to form a metastable binary alloy colloid in step a) is in excess of 100° C.

9. The method of claim 8, wherein said temperature is in a range of from 200-250° C.

10. The method of claim 1, wherein said reducing agent in step a) is n-butyllithium.

11. The method of claim 1, wherein said reducing agent in step a) is sodium naphthalide.

12. The method of claim 1, wherein said reducing agent in step a) is potassium naphthalide.

13. The method of claim 1, wherein said first metal is Au, and said second metal is selected from the group consisting of W and Rh.

14. The method of claim 1, wherein said metastable binary alloy nanoparticles produced are PtW.

15. The method of claim 1, wherein the metastable binary alloy nanoparticles have a size of from 1 nm to 30 nm.

16. The method of claim 1, which further comprises after step c), redispersing the deposited metastable binary alloy nanoparticles in a solvent and a surfactant.

17. The method of claim 16, wherein the surfactant comprises oleic acid and oleylamine.

18. The method of claim 16, wherein the solvent is toluene.

* * * * *